United States Patent [19]

Hau

[11] Patent Number: 4,787,537

[45] Date of Patent: Nov. 29, 1988

[54] HIGH-PRESSURE METERING APPARATUS

[75] Inventor: Egbert Hau, Offenbach, Fed. Rep. of Germany

[73] Assignee: Hau-Simex Giesserei-und Oberfalchentechnik Vetriebsgesellschaft m.b.H., Offenbach am Main, Fed. Rep. of Germany

[21] Appl. No.: 67,212

[22] Filed: Jun. 26, 1987

[30] Foreign Application Priority Data

Jun. 30, 1986 [DE] Fed. Rep. of Germany ....... 3621947

[51] Int. Cl.$^4$ .............................................. B67D 5/00
[52] U.S. Cl. .................................. 222/334; 222/380; 222/493; 222/496
[58] Field of Search ............... 222/334, 387, 388, 389, 222/491–496, 380, 513, 514, 518, 568, 567, 546, 372, 333; 309/533.1, 583, 584; 425/DIG. 224, DIG. 227; 137/540, 543.15, 543.17, 508

[56] References Cited

U.S. PATENT DOCUMENTS

| 1,403,197 | 1/1922 | Rieck | 222/567 X |
| 1,977,869 | 10/1934 | Ulm | 222/492 |
| 2,142,081 | 1/1939 | Olive | 222/387 |
| 2,169,291 | 8/1939 | Rotter | 222/334 |
| 3,076,583 | 2/1963 | Eberspächer | 222/493 |
| 3,758,005 | 9/1973 | Christine et al. | 222/309 |
| 3,828,986 | 8/1974 | Roth | 222/380 X |
| 4,690,310 | 9/1987 | Rasmussen | 222/388 X |

FOREIGN PATENT DOCUMENTS

| 520344 | 8/1955 | Belgium | 222/380 |
| 1913501 | 10/1969 | Fed. Rep. of Germany . |
| 3202189 | 8/1983 | Fed. Rep. of Germany . |
| 3621947 | 11/1987 | Fed. Rep. of Germany . |
| 1568528 | 5/1980 | United Kingdom . |
| 86/03290 | 6/1986 | World Int. Prop. O. . |

Primary Examiner—Joseph J. Rolla
Assistant Examiner—Nils E. Pedersen
Attorney, Agent, or Firm—Toren, McGeady & Associates

[57] ABSTRACT

A high pressure metering apparatus for ejecting a fluid such as a polishing paste comprises a housing having a storage chamber, a spring-loaded, stroke-adjustable compressed air piston-cylinder device with a plunger, an injection nozzle, and an adjustable valve device closing the storage chamber off from the injection nozzle. The valve device includes a valve ball and a valve plate. A piston element is fixed to the housing, to which piston element the valve ball is concentrically fixed, and on which a cylinder element is displaceably mounted. The cylinder element is closed by the valve plate of the valve device, which has a valve seat situated opposite the valve ball. The injection nozzle is located downstream of the valve plate and is fixed to the cylinder element. A compression spring bears against the cylinder element and a clamping cap. The valve plate is thus fixed in the cylinder element independently of the injection nozzle, which is removable by a screwed connection passing through a front opening of the clamping cap. The injection nozzle can then be replaced without disturbing the valve setting.

7 Claims, 1 Drawing Sheet

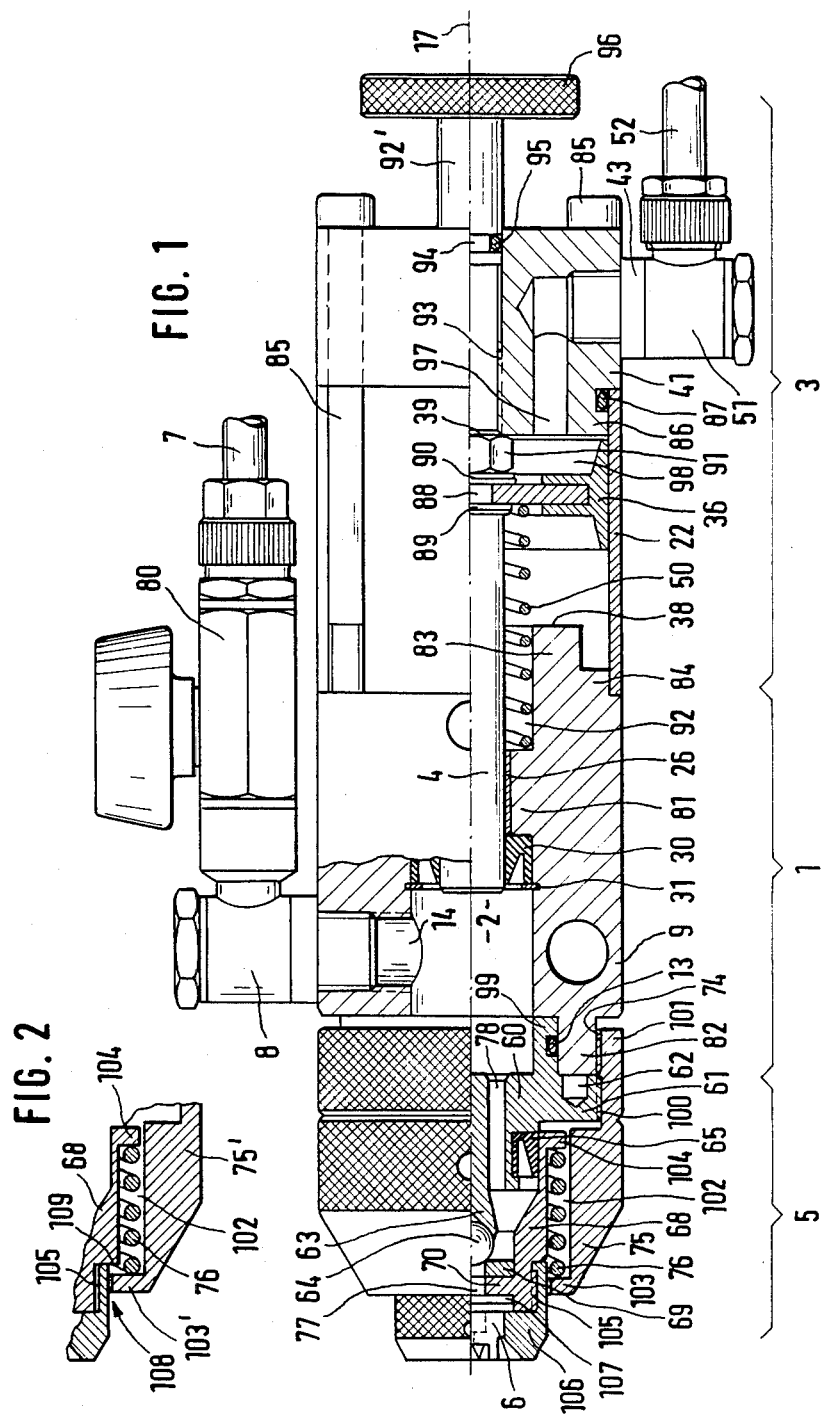

HIGH-PRESSURE METERING APPARATUS

FIELD OF THE INVENTION

This invention relates to a high-pressure metering apparatus for ejecting a fluid such as a polishing paste.

DESCRIPTION OF THE PRIOR ART

Such an apparatus is known from DE-PS No. 32 02 189, which has a special valve device, in which a stationarily mounted valve ball is situated opposite a valve plate slidably mounted together with a cylinder element. A valve seating for the valve ball is situated in the valve plate. Due to the mounting of the valve plate in the slidable cylinder element, which possesses a relatively large cross-sectional area, a very large hydraulic active surface is available for the liquid to be ejected from the storage chamber. The changes in the size of the bearing area between the valve seating and valve ball resulting from wear therefore have only a very slight influence, as compared with the total size of the hydraulic active surface, upon the working and ejection pressure of the apparatus. The latter is adjustable by means of a clamping cap and a compression spring loaded by it, and this pressure therefore advantageously remains virtually constant over long operating periods. In the known apparatus, the valve plate together with the injection nozzle bearing against it is secured to the cylinder element by means of a retaining nut in such a manner that, when replacement of the injection nozzle is desired, the clamping cap, the compression spring bearing against it and the retaining nut common to the injection nozzle and valve plate must be removed, to enable the injection nozzle finally to be pulled out. Apart from the work required for this purpose, when the clamping cap is loosened the setting of the valve device is lost, so the valve device must therefore be re-adjusted to the desired ejection pressure by setting the spring force by means of the clamping cap, after the injection nozzle has been replaced and the aforementioned components have been refitted. If, in addition, in this known device the piston element with the valve ball fixed thereto has also to be removed, for example if a replacement due to wear becomes necessary, then a number of screws have to be loosened for this purpose, to gain access to the piston element, housed in a separate housing lid. Maintenance work on this known apparatus therefore requires considerable work and time, on account of the numerous parts present in the known apparatus.

SUMMARY OF THE INVENTION

According to one aspect of the present invention, there is provided a high-pressure metering apparatus for ejecting a fluid such as a polishing paste, comprising a housing having a storage chamber, a spring-loaded, stroke-adjustable compressed air piston-cylinder device with a plunger displaceable into the storage chamber, an injection nozzle, an adjustable valve device closing the storage chamber off from said injection nozzle and controlled in use by the pressure in the storage chamber, said valve device including a valve ball and a valve plate, and said housing further including a low-pressure fluid supply line leading to the storage chamber, there being a non-return valve in said low-pressure line, the storage chamber having an outlet side bounded by a piston element fixed to said housing, to which piston element said valve ball of said valve device is concentrically fixed and on which a cylinder element is displaceably mounted with the intermediary of a sealing ring, which cylinder element is closed by said valve plate of the valve device which possesses a valve seating situated opposite the valve ball and adjoining a through bore, said injection nozzle being located downstream of said valve plate and being fixed to said cylinder element the apparatus further comprising a compression spring against which said cylinder element bears and a clamping cap against which said compression spring thrusts, said clamping cap having a front opening and being screwed externally onto the housing, and there being a space bounded by said piston element, the cylinder element and the valve plate which is connected with said storage chamber via bores passing through the piston element, and the axes of symmetry of the valve device, the housing, the storage chamber, the compressed air piston-cylinder device and the plunger are in alignment, the arrangement being such that said valve plate is fixed in said cylinder element independently of said injection nozzle, which is removable by a screwed connection without adversely affecting the setting of said valve device, which screwed connection passes through said front opening of the clamping cap, and the securing in use of the piston element to the housing takes place as the clamping cap surrounding the valve device is screwed onto the housing.

By the fixing of the valve plate in the cylinder element independently of the injection nozzle, the injection nozzle can be withdrawn and replaced in a simple manner without actuating the clamping cap, so that the valve setting is completely retained, i.e. valve plate and valve ball remain pressed together by the compression spring set by means of the clamping cap. The piston element is secured to the housing by the clamping cap, instead of a housing lid, which results in a very simple construction of the present apparatus. Simply by unscrewing the clamping cap from the housing, all the parts of the valve device and the elements associated with it can be removed from the housing in the manner of a replacement head and again fitted to the housing in an equally simple manner.

Preferably, the valve plate, bearing against an annular projection of the cylinder element, is disposed on the side of the annular projection nearest the valve ball, whereas the injection nozzle is disposed on the side of the annular projection remote from the valve ball and is held by a lock nut, which is screwed onto an externally threaded projection of the cylinder element. Here, therefore, in known manner (DE-PS No. 32 02 189) an annular projection is provided in the cylinder element, against which annular projection however, the valve plate and the injection nozzle bear from different sides, so that assurance is provided in a simple way that the valve plate remains in its position when the injection nozzle has been removed by means of the lock nut.

Preferably, the piston element has a flange, which possesses an external thread which corresponds to an external thread of the housing onto which the clamping cap can be screwed, and which immediately adjoins thereto, uninterruptedly continuing the thread, when the flange of said piston element and said housing are bearing against each other. Here, an especially advantageous manner of simultaneously fixing the piston element and the clamping cap to the housing is proposed. For this purpose, the piston element is equipped in known manner (DE-PS No. 32 02 189) with a flange, which is non-rotatably secured to the housing but possesses an external thread, which agrees in a characteristic manner with the housing external thread, onto which the clamping cap is screwed. As a result, the clamping cap is both the adjustment element for the compression spring and the fixing element for the piston element.

An especially favourable spring characteristic of the compression spring for setting the ejection pressure, combined with a compact housing of same, is achieved by arranging for the cylinder element and the clamping cap to be bound by a hollow cylindrical annular space, in which the compression spring, which is a helical compression spring, is disposed, which bears against an inwardly orientated annular projection of the clamping cap and against an outwardly orientated annular projection of the cylinder element.

The ejection stroke of the cylinder element is preferably bounded by a stop which is active before the full compression travel of the compression spring is reached so that full compression of the turns of the compression spring is prevented by a stop.

The stop which limits the ejection stroke is preferably formed by an annular projection on the clamping cap.

According to another aspect of the present invention, there is provided a high-pressure metering apparatus for ejecting a fluid such as a polishing paste, comprising a housing having a storage chamber, a spring-loaded, stroke-adjustable compressed air piston-cylinder device with a plunger displaceable into the storage chamber, an injection nozzle, an adjustable valve device closing the storage chamber off from said injection nozzle and controlled in use by the pressure in the storage chamber, said valve device including a valve plate, the storage chamber having an outlet side bounded by a piston element fixed to said housing, on which a cylinder element is displaceably mounted, which cylinder element is closed by said valve plate of the valve device, said injection nozzle being located downstream of said valve plate and being fixed to said cylinder element, the apparatus further comprising a compression spring against which said cylinder element bears and a clamping cap against which said compression spring thrusts said clamping cap having a front opening and being screwed externally onto the housing, the arrangement being such that said valve plate is fixed in said cylinder element independently of said injection nozzle, which is removable by a screwed connection without adversely affecting the setting of said valve device, which screwed connection passes through said front opening of the clamping cap, and the securing in use of the piston element to the housing takes place as the clamping cap surrounding the valve device is screwed onto the housing.

BRIEF DESCRIPTION OF THE DRAWINGS

For a better understanding of the invention and to show how the same may be carried into effect, reference will now be made, by way of example, to the accompanying drawing, in which:-

FIG. 1 is a longitudinal sectional side view, partly cut-away, of a high-pressure metering apparatus, and FIG. 2 is a cut-away section through a modified form of the apparatus head.

DESCRIPTION OF THE PREFERRED EMBODIMENT

The high-pressure metering apparatus illustrated comprises basically three component groups, namely a housing 1, with a storage chamber 2 located centrally therein, a compressed air piston-cylinder device, hereinafter termed a compressed air motor 3 for short, with a cylindrical plunger 4, likewise mounted centrally therein and penetrating into the storage chamber 2, and a valve device 5 with an injection nozzle 6 mounted thereon. A low-pressure line 7 for fluid such as a polishing paste or emulsion to be ejected in metered manner out of the injection nozzle 6 leads to the storage chamber 2. There is a non-return valve 8 and a shut-off valve 80 in the low-pressure line. The cylindrical plunger 4 has a smaller diameter than the co-axially mounted and also cylindrical storage chamber 2, so that the plunger in its piston-like displacement action can penetrate without contact into the storage chamber 2. The component groups, referenced generally 1, 3 and 5, will now be explained in more detail.

The housing 1 is thick-walled and consists of a main body 9, square in cross-sectional outline, which is equipped in its central zone with a radial annular projection 81 for mounting the plunger 4. At its forward end face, the main body 9 carries an axial annular projection 82, concentric with the main axis 17 of the high-pressure metering apparatus, the function and construction of which projection will be explained below. A transverse bore 14, leading into the storage chamber 2, serves for the sealed mounting of a non-return valve 8 of the low-pressure line 7. At the rear end of the main body 9 there are two axial annular projections 83 and 84, of which the inner axial annular projection 83 at the end forms an inner stop 38 for the compressed air motor 3, while the outer axial annular projection 84 possesses an external thread for the sealed screwing-on of a cylinder 22 for receiving compressed air. The compressed air motor 3 comprises basically the cylinder 22, a piston 36, axially slidable and sealed therein, and a cylinder head 41, closing off the outer end of the cylinder 22. The cylinder head 41 possesses, like the housing 1, a square outline in cross-section and is connected to the main body 9 of the housing 1 releasably by threaded bolts 85, disposed at the corners of the square outline. The cylinder head 41 engages, with a cylindrical projection 86 concentric with the main axis 17, into the outer end of the cylinder 22 and is sealed with respect to the cylinder 22 by a sealing ring 87, which is laid in a peripheral groove of the cylindrical projection 86.

The piston 36 is concentrically fixed to the rear end of the plunger 4. For this purpose, the plunger 4 is equipped with a stud projection 88, which passes through a central bore of the piston 36 and through discs 89 and 90, bearing against the piston from opposite sides. A nut 91 is screwed onto an external thread of the stud projection 88 to make a firm connection between the plunger 4 and the piston 36. The plunger 4 is axially slidably guided on the radial annular projection 81 of the main body 9 by a sliding bearing bushing 26. At its end penetrating into the storage chamber 2, it is surrounded by a grooved annular seal 30, which bears sealingly, on the one hand against the outer periphery of the plunger 4, and on the other hand against the cylinder wall of the storage chamber 2. The grooved annular seal 30 bears against the radial annular projection 81 and is held in its position by a securing ring 31, set in the cylinder wall of the storage chamber 2. On the side of the radial annular projection 81 remote from the grooved annular seal 30, there is a helical compression spring 50, which is inserted into an annular space 92, located between the plunger 4 and the wall of the main body 9, and bears with prestress on the one hand against the radial annular projection 81 and on the other hand against the piston 36.

The stroke travel of the piston 36 in the cylinder 22 is limited on the one hand by the inner stop 38 and on the other hand by an adjustable, outer stop 39. The outer stop 39 is formed of the end face of a threaded spindle 92′, which is passed through a central bore of the cylinder head 41 and is screwed into an internal thread 93 of this central bore. The sealing of the threaded spindle 92′ with respect to the central bore is provided by a sealing ring 95, placed in a circumferential groove 94 of the threaded spindle 92′. A knurled head 96 for rotatably actuating the threaded spindle 92′ is fixed at the outer end of the threaded spindle 92′. In the adjustable, outer limiting position, the nut 91 or end face of the stud projection 88 respectively meets the outer stop 39. This situation is shown in FIG. 1, for the maximum stroke travel of the compressed air motor 3.

In the cylinder head 41 there is a bore 97, to which a compressed air feed pipe 43 is connected. The bore 97 leads into the compression chamber 98 of the compressed air motor 3, so that the compressed air, even in the abutment position illustrated in the drawing, can act upon almost the entire active area of the piston 36 at the start of the working stroke of the plunger 4. Without compressed air action, the helical compression spring 50 displaces the piston 36 into the position shown in FIG. 1. The plunger 4 is then substantially retracted from the storage chamber 2, so that this chamber can be filled via the low-pressure line 7 and shut-off valve 80 and the non-return valve 8 with liquid to be ejected. The compressed air feed pipe 43 is connected with a compressed air source, not shown, via a pivotal screwed connection 51 and attached length of hose 52, through the intermediary of a manually or automatically actuated control valve (also not shown), for example a solenoid valve.

For explaining the valve device 5, reference is now made to the forward region of the apparatus illustrated in the drawing. At the outlet side of the storage chamber 2 there is a hat-shaped piston element 60, which in practice forms the lid of the housing 1 and, for this purpose, is introduced co-axially with the main axis 17 until an axial annular projection 99 of the element 60 bears against an annular step formed by the axial annular projection 82 of the main body 9. The axial annular projection 99 defines a cylinder chamber having the same diameter as the storage chamber 2 and continuing this storage chamber forwards, this cylinder chamber being a component of the storage chamber 2. Sealing against the outside is provided by a sealing ring 13, which is placed in a circumferential groove of the axial annular projection 99 and bears against the axial annular projection 82 of the main body 9. The piston element 60 possesses a flange 61, extending in the radial direction, which bears against the end face of the axial annular projection 82 and has the same external diameter. The axial annular projection 82 is equipped with an external thread 74, to which an external thread 100 on the external circumferential surface of the flange 61 corresponds. The external threads 74 and 100 are so arranged that the components of the thread continue one another uninterruptedly in the assembled position shown in FIG. 1. In the axial annular projection 82 there is at least one cylindrical pin 62, which engages into a corresponding bore of the flange 61 and thus secures the piston element 60 preventing rotation relative to the housing.

The piston element 60 carries, on a projection 63 concentric with the main axis 17, a valve ball 64 firmly connected with it, made for example of a wear-resistant hard metal. A sealing ring 65, formed as a grooved ring, is mounted on the outer circumference of the piston element 60, which sealing ring acts as a piston ring and is self-sealing in the manner of a lip seal. A cylinder element 68 is axially slidably guided on the piston element 60 and possesses a cylindrical internal bore, into which the piston element 60 engages with the intermediary of the sealing ring 65. The cylindrical internal bore of the cylinder element 68 tapers via a conical transition zone to a further cylinder bore of smaller diameter, the outer end of which is marked by an annular projection 70. A valve plate 69 bears against the annular projection 70, the valve opening of this plate forming with its inner edge a valve seating for the valve ball 64. The valve opening is adjoined by a through bore 77, bounded by the annular projection 70, and leading directly to the injection nozzle 6.

A clamping cap 75 is screwed onto the external threads 100 and 74, the cap possessing for this purpose a sleeve projection 101 with a continuous internal thread. The cylinder element 68 and the clamping cap 75 bound a hollow cylindrical annular space 102, in which a helical compression spring 76 is disposed with radial clearance relative to the cylinder element 68 and also to the clamping cap 75. The helical compression spring 76 bears with prestress, on the one hand against an inwardly orientated annular projection 103 of the clamping cap 75 and on the other hand against an outwardly orientated annular projection 104 of the cylinder element 68. The annular projection 104 has, with its outer periphery, radial clearance relative to the inner wall of the clamping cap 75 facing it and contributes to the guiding and centering of the cylinder element 68 on the piston element. It can be seen that by screwing up the clamping cap 75 onto the outer threads 74, 100 to a greater or lesser extent, the stress of the helical compression spring 76 and thus its force can be adjusted.

Like the valve ball 64, the valve plate 69 may also be made from a very hard material, for example of a titanium alloy or of tungsten carbide. The space bounded by the piston element 60, the cylinder element 68 and the valve plate 69 is in communication with the storage chamber 2 via bores 78 passing through the piston element 60. It can be seen that by corresponding screwing movements of the clamping cap 75 the helical compression spring 76 can be stressed to a greater or lesser extent, so that the applied force between the valve plate 69 and valve ball 64 is adjustable. In this manner, the ejection pressure of the apparatus can be exactly set. The set ejection pressure is reached when the liquid pressure acting upon the cross-sectional area of the cylinder bore of the cylinder element 68, less the area of the ball seating, is greater than the sum of the set spring force of the helical compression spring 76 and the friction on the sliding surfaces.

At the outer end of the cylinder element 68 there is an externally threaded projection 105, onto which a lock nut 106 is screwed, which presses the injection nozzle 6 through the intermediary of a sealing ring 107 against the side of the annular projection 70 remote from the valve ball 64. The lock nut 106 extends through a front opening 108 (FIG. 2) of the clamping cap 75. The front opening 108 is defined by the annular projection 103.

By mounting the valve plate 69 on the inner face of the annular projection 70 and mounting the injection nozzle 6 on the outer face of this annular projection 70, the injection nozzle 6 can be removed and if necessary replaced by unscrewing the lock nut 106, without influencing the setting of the valve device 5. It can also be seen that the entire head region of the apparatus can be removed by unscrewing the clamping cap 75. If the clamping cap 75 is unscrewed, starting from the position of the parts shown in FIG. 1, then the piston element 60 first remains in its position shown, because it is prevented by the cylindrical pin 62 from rotating with the unscrewing of the clamping cap 75. It is only when the clamping cap 75 has been unscrewed from the external thread 74 of the axial annular projection of the main body 9, and the sleeve projection 101 engages only the external thread 100, that the apparatus head region, including the piston element 60, can be pulled off the housing 1. In re-assembling the head, the piston element 60 is first pushed onto the housing 1 until the adjacent faces abut, after which the clamping cap 75 is screwed on.

In the example shown in FIG. 1, if the helical compression spring 76 is appropriately designed and set, a limitation of the stroke travel for the cylinder element 68 occurs when the turns of the helical compression spring 76 bear against one another, that is to say after travelling through the full compression stroke of the helical compression spring. In the example according to FIG. 2, in contrast, the cylinder element 68 is so constructed that it possesses an annular shoulder 109, radially adjoining the inner end of the externally threaded projection 105, which annular shoulder limits the stroke of the cylinder element 68 in the ejection operation because it meets the annular projection 103' of the clamping cap 75', lying in its path. The design of the co-operating parts may be such that the annular shoulder 109 has already met the annular projection 103' before the helical compression spring 76 is completely compressed. The method of functioning of the apparatus is described below, starting from the position of the components shown in FIG. 1. The storage chamber 2 is filled, for example, with polishing paste via the low-pressure line 7 and the valves 80 and 8, care being taken at the start to ensure venting of the storage chamber 2. Filling of the storage chamber 2 is carried out, including all the bores and chambers communicating with it, i.e. as far as the valve plate 69. In the succeeding operating condition, the polishing paste in the low-pressure line 7 remains always at approximately constant pressure. If compressed air is now supplied to the compressed air motor 3, it displaces the piston 36 towards the left, the plunger 4 penetrating into the storage chamber 2. Due to the incompressibility of the polishing paste, a very high pressure very rapidly builds up in the storage chamber 2, the value of this pressure being dependent upon the area transmission ratio of the active surfaces on the compressed air piston 36 and plunger 4 and upon the air pressure.

If the high pressure of the polishing paste in the storage chamber 2 exceeds the set spring force of the helical compression spring 76 and the comparatively very much smaller frictional force of the sliding surfaces, then the cylinder element 68 displaces to the left, the valve plate 69 lifting off the valve ball 64, which remains stationary, so that the through bore 77 in the valve plate 79 is exposed. The polishing paste now squirts out of the injection nozzle 6 until the compressed air piston 36 has reached its inner stop 38. Immediately afterwards, the pressure in the storage chamber 2 rapidly drops, so that the spring force of the helical compression spring 76 again becomes greater than the force exerted on the cylinder element 68 by the residual paste remaining in the storage chamber 2, plus the frictional force acting at the sliding surfaces. The helical compression spring 76 therefore now displaces the cylinder element 68 again to the right, until the valve plate 69 bears sealingly against the valve ball 64. If the compressed air supply is now interrupted and the compressed air feed line is vented, the helical compression spring 50 of the compressed air motor 3 displaces the piston 36 to the right as far as its outer stop 39. The pressure in the storage chamber 2 falls still further, down to a value below the pressure existing in the low-pressure line 7. Due to this, the non-return valve 8 opens and the paste flows into the storage chamber 2 depending upon how much the plunger 4 moves outwards. The high-pressure metering apparatus is thus now ready for the next working cycle. As the pressure in the storage chamber 2 builds up due to the entering plunger 4, the non-return valve 8 closes off the low-pressure line.

The stroke travel of the plunger 4 in the working stroke and therefore the metered quantity of polishing paste to be ejected, depends upon the setting of the threaded spindle 92 and of the outer stop mounted on it. In FIG. 1, the position of the components is shown for a maximum stroke travel of the plunger 4 and thus for a maximum metered quantity. If the stroke travel of the plunger 4 and metered quantity are to be reduced, the threaded spindle is screwed further into the cylinder head 41, causing the outer stop 39 to displace towards the left.

I claim:

1. A high-pressure metering apparatus for ejecting a fluid such as a polishing paste, comprising a housing having a storage chamber, a spring-loaded, stroke-adjustable compressed air piston-cylinder device with a plunger displaceable into the storage chamber, an injection nozzle, an adjustable valve device closing the storage chamber off from said injection nozzle and controlled in use by the pressure in the storage chamber, said valve device including a valve ball and a valve plate, and said housing further including a low-pressure fluid supply line leading to the storage chamber, there being a non-return valve in said low-pressure line, the storage chamber having an outlet side bounded by a piston element fixed to said housing, to which piston element said valve ball of said valve device is concentrically fixed and on which a cylinder element is displaceably mounted with the intermediary of a sealing ring, which cylinder element is closed by said valve plate of the valve device which possesses a valve seating situated opposite the valve ball and adjoining a through bore, said injection nozzle being located downstream of said valve plate and being fixed to said cylinder element the apparatus further comprising a compression spring against which said cylinder element bears and a clamping cap against which said compression spring thrusts, said clamping cap having a front opening and being screwed externally onto the housing, and there being a space bounded by said piston element, the cylinder element and the valve plate which is connected with said storage chamber via bores passing through the piston element, and the axes of symmetry of the valve device, the housing, the storage chamber, the compressed air piston-cylinder device and the plunger are in alignment, the arrangement being such that said valve plate is fixed in said cylinder element independently of said injection nozzle, which is removable by a screwed connection without adversely affecting the setting of said valve device, which screwed connection passes through said front opening of the clamping cap, and the securing in use of the piston element to the housing takes place as the clamping cap surrounding the valve device is screwed onto the housing.

2. An apparatus according to claim 1, wherein the valve plate, bearing against an annular projection of the cylinder element, is disposed on the side of the annular projection nearest the valve ball, whereas the injection nozzle is disposed on the side of the annular projection remote from the valve ball and is held by a lock nut, which is screwed onto an externally threaded projection of the cylinder element.

3. An apparatus according to claim 1, wherein said piston element has a flange, which possesses an external thread, which corresponds to an external thread of the housing onto which the clamping cap can be screwed, and which immediately adjoins thereto, uninterruptedly continuing the thread, when the flange of said piston element and said housing are bearing against each other.

4. An apparatus according to claim 1, wherein the cylinder element and the clamping cap bound a hollow cylindrical annular space, in which the compression spring, which is a helical compression spring, is disposed, which bears against an inwardly orientated annular projection of the clamping cap and against an outwardly orientated annular projection of the cylinder element.

5. An apparatus according to claim 1, wherein the ejection stroke of the cylinder element is bounded by a stop which is active before the full compression travel of said compression spring is reached.

6. An apparatus according to claim 5, wherein said stop is formed by an annular projection on said clamping cap.

7. A high-pressure metering apparatus for ejecting a fluid such as a polishing paste, comprising a housing having a storage chamber, a spring-loaded, stroke-adjustable compressed air piston-cylinder device with a plunger displaceable into the storage chamber, an injection nozzle, an adjustable valve device closing the storage chamber off from said injection nozzle and controlled in use by the pressure in the storage chamber, said valve device including a valve plate, the storage chamber having an outlet side bounded by a piston element carrying a valve ball engaging said valve plate fixed to said housing, on which a cylinder element is displaceably mounted, which cylinder element is closed by said valve plate of the valve device, said injection nozzle being located downstream of said valve plate and being fixed to said cylinder element, the apparatus further comprising a compression spring against which said cylinder element bears and a clamping cap against which said compression spring thrusts, said clamping cap having a front opening and being screwed externally onto the housing, the arrangement being such that said valve plate is fixed in said cylinder element independently of said injection nozzle, which is removable by a screwed connection without adversely affecting the setting of said valve device, which screwed connection passes through said front opening of the clamping cap, and the securing in use of the piston element to the housing takes place as the clamping cap surrounding the valve device is screwed onto the housing.

* * * * *